Figure 1:
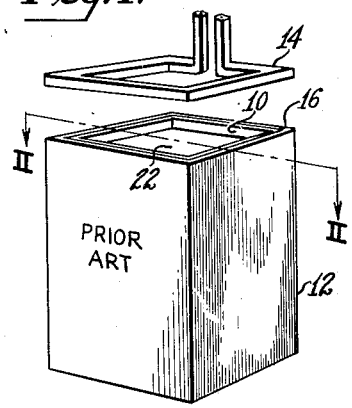

June 28, 1949.

T. H. STORY 2,474,703

INDUCTION HEATING COIL PROVIDING
DISTRIBUTION OF HEATING EFFECT

Filed Sept. 28, 1944

INVENTOR.
Theodore H. Story
BY
ATTORNEY

Patented June 28, 1949

2,474,703

UNITED STATES PATENT OFFICE 2,474,703

INDUCTION HEATING COIL PROVIDING DISTRIBUTION OF HEATING EFFECT

Theodore H. Story, Merchantville, N. J., assignor to Radio Corporation of America, a corporation of Delaware Application September 28, 1944, Serial No. 556,125

2 Claims. (Cl. 219—13)

This invention relates to induction heating, and has particular reference to the problem of providing a desired distribution of induced heating current in work to be heated.

It is frequently desirable to control the distribution of density of induced current in a conductor. The problem is not to be confused with attempts to control the depth of penetration of the current induced in a conductor, but concerns itself with the distribution of induced current density, for example, in a region to be inductively heated.

An illustration of the type of problem for which the present invention provides a solution is that in the inductive heating of a rectangular or other non-circular region, the density of the induced heating currents is appreciably less at the corners than at other portions of the region. Such non-uniform distribution of induced current density may arise because of the shape of the region to be heated or of the induction coil, or for other reasons; and in such cases, it may be desired to determine the distribution so as to provide uniform density over the whole region to be heated. In other cases, it may be desirable to determine the distribution so as to provide a particular distortion of an otherwise uniform field.

One object of the invention, therefore, is to provide means for effecting substantially uniform heating by induction in a case where, by reason of the shape of the work or of the induction coil, or otherwise, there is a tendency for the heating to be non-uniform.

Another object of the invention is the converse of the previous object, namely to provide means for distorting current induced by an otherwise uniform electromagnetic field.

A further object of the invention is to provide means for controlling the distribution of current induced by an electromagnetic field.

Another object is to provide means for controlling the distribution of current density induced by an electromagnetic field.

A further object of the invention is to provide means whereby the flux density at any given point in an electromagnetic field may be regulated.

Another object is to provide an improved method of and means for controlling flux density at any point in an electromagnetic field.

A further object is to provide an improved induction heating coil.

Some of the methods of the prior art which have been employed to control distribution of induced current may be classified as follows:

1. Applications of the "proximity effect."

2. The use of shielding plates, consisting of conductive elements applied to a portion of the work. These plates prevent current from being induced in the portions so protected.

3. The insertion in the flux path of magnetic deflecting elements for deflecting flux from a given portion of the work.

4. The use of shading coils, that is, auxiliary induction coils, the current in which is out of phase with that in the main induction coils, with a consequent weakening of the inductive effect at the affected portion of the work.

The present invention is distinguished from these prior art methods in that the distribution of induced current is controlled by controlling the density of a selected portion or portions of the inducing current. In one embodiment, this is achieved by attaching conductive plates or strips to portions of the induction work coil, whereby to increase the area over which the inducing current which flows in those portions is spread; the density of the inducing current at those portions is thus reduced. In another embodiment, an integral coil is provided, in some portions of which the area which is in effective inductive relation with corresponding portions of the work is of different extent from that of other portions of the coil.

In either case, the magnetic flux lines linking the induction coil to the work become of different length at different portions of the coil and the work, and the flux linkage at those portions between coil and work is different, also. The density of the induced currents is thus rendered different at different portions of the work. As a modification of the first-mentioned embodiment, the plates may be formed to a trough-like shape; and adjustment of the angle which the sides of the trough make with the bottom provides a further control of the density of the induced current at points on the work in inductive relation with the plates.

Figure 3:
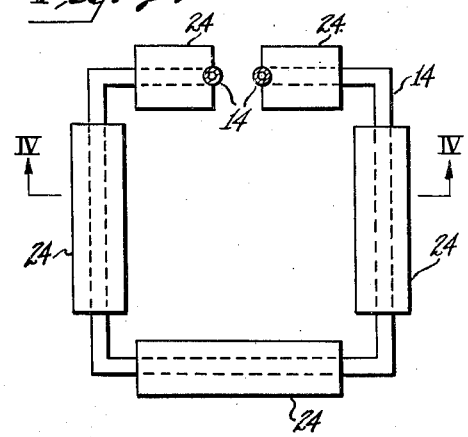
Figure 5:
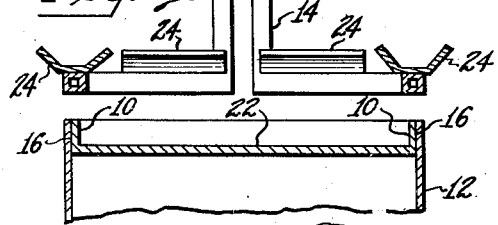
Figure 4:
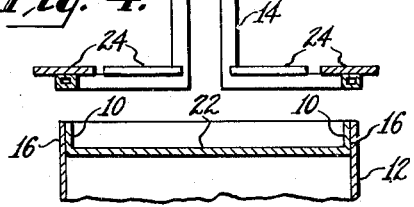
Figure 6:
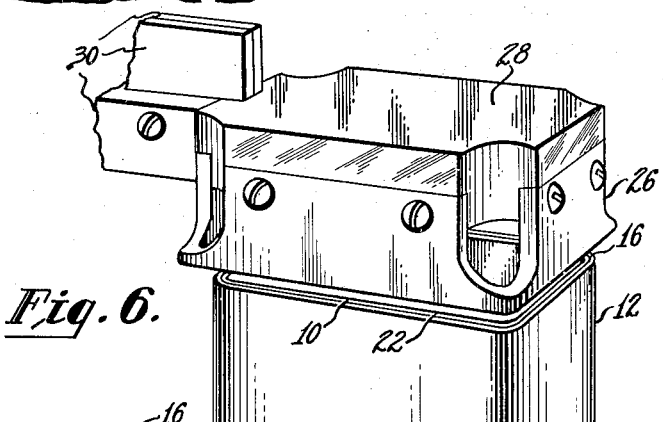
Figure 2:
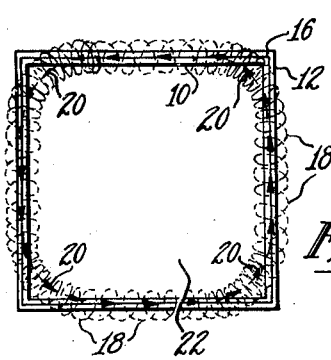

The invention may be better understood from a consideration of the following description of three embodiments thereof, when read in conjunction with the accompanying drawing, in which:

Figure 1 is a view in perspective of an induction coil of the prior art and of work to be heated thereby, Figure 2 is a diagram illustrating the distribution of magnetic flux and induced current in the arrangement of Figure 1, Figure 3 is a plan view of one embodiment of the invention, Figure 4 is a view in vertical section taken along the line IV—IV of Figure 3, Figure 5 is a view in vertical section of an arrangement of a work coil having conductive plates attached thereto according to the invention and constituting a modification of the devices of Figures 3 and 4, and Figure 6 is a view in perspective of a preferred embodiment of the invention in operative relation to the work to be heated.

In Figures 1, 4, 5 and 6, there is indicated at 12 a hollow object of rectangular cross-section, such as a transformer can or the like. A lid 22, having an upturned flange 10 around its edge, is to be welded to the can 12 by induction heating. In the drawing, the thicknesses of both the can and the flange have been deliberately exaggerated for the sake of clarity. The area or region which is to be inductively heated is the rectangular zone 16 constituting the interfaces between the lid and the can.

The type of welding here illustrated is known as "bead" welding, since on being welded together a bead is formed by the flange 10 and portions of the can in contact therewith; but the invention is equally applicable to the more familiar "lap" welding. Solder or cements may be used in connection with the invention.

If an induction coil having a circular turn is used, then at best some parts of the rectangular zone 16 will be heated more than others; and for this reason, a single-turn coil 14 (Fig. 1), having the same rectangular shape as the zone 16 and of equal extent therewith, is employed, so that each part of the coil is in inductive relation with a corresponding part of the heating zone. Even with such a coil, however, it is found in practice that the corners of the zone 16 are heated to an appreciably less extent than the sides.

The reason for this non-uniformity is believed to be that the magnetic flux lines which link the coil and the heating zone tend to crowd together at the corners, and therefore to concentrate there. These flux lines may be thought of as rings, and are indicated in Fig. 2 by dotted lines 18. As a result of this concentration, there is a tendency for the current induced in the heated zone (shown in Fig. 2 by broken lines 20) to cut the corners, and thus wholly or partially to by-pass them with a consequent decrease in density at the corners. The sides of the rectangular zone 16 are thus excessively heated at the expense of the corners.

In one attempt to solve this problem, the rectangular coil was flared outwards at the corners, but this did not result in the desired uniformity of distribution.

According to the invention, plates, strips or fins 24 of conductive material, preferably copper, are welded or otherwise attached to the portions of the coil 14 which cause excessive or undesired heating, and make electrical connection with those portions. As may be seen in Fig. 3, the plates are connected to the sides of the rectangle formed by the coil, and are spaced from the corners, the amount of spacing depending on the curvature of the induced current at the corners.

The action of the plates 24 may be explained as follows: They increase the effective cross-sectional area of those portions of the coil to which they are attached, and thus decrease the density of the inducing current which flows in those portions. Considering, for the present, only those portions of the coil to which the plates are attached and the parts of the heating zone in inductive relation therewith, the magnetic flux lines which link the coil with the region to be heated are lengthened, the flux linkage between the coil and the heating zone is reduced, and the density of the induced current at the sides of the region to be heated is, therefore, correspondingly reduced. However, in the corners of the coil to which the plates 24 are not attached, and the corners of the heating zone which are in inductive relation with those corners, there is no change in the density of the inducing current. The length of the magnetic flux lines is unaltered, the flux linkage is the same, and the density of the induced current is equally unaltered.

Looked at in another way, it may be said that the reluctance of the magnetic flux paths linking the coil with those portions of the work in which induced current density is found low, is decreased, while the reluctance of the magnetic flux paths linking the coil with the remainder of the work is maintained constant. By this means a desired uniformity or non-uniformity of distribution of induced current throughout the entire heating zone may be obtained.

In practice it has been found desirable to have the plates 24 several times as wide as the conductor induction coil to affect the desired distribution of flux. In the case illustrated in Fig. 1, the lid and can were satisfactorily and uniformly welded throughout the entire rectangular heating zone 16 by the use of the plates 24. The frequency of alternating electrical energy employed was between 700 and 800 kilocycles per second, and the heating cycle was approximately ¼ of a second. The power input to the work was of the order of 40 kilowatts, the rectangular zone to be welded having a total length of 16 inches and an effective depth of $\frac{1}{16}$ inch. It is desirable to use hollow coils, because at high frequencies the current concentrates on the outside of the inductor and because cooling fluid may then be circulated through the coil.

A modification of the arrangement illustrated in Figs. 3 and 4, and permitting finer control of the distribution of induced current density, is shown in Fig. 5. The plates 24, instead of lying flat on the coil, are formed into the trough-like shape illustrated. Adjustment of the angle which the sides of the trough make with the horizontal affects the density of the induced current, since the flux path between any plate 24 and the part of the heating zone 16 in inductive relation therewith is short when the plate is horizontal (as in Fig. 3), and becomes longer as the sides of the trough become more vertical.

A presently preferred embodiment of the invention is illustrated by Fig. 6. An integral, single-turn, hollow coil 26 formed by bending a relatively wide conductor of uniform thickness having transverse slots to form a coil of rectangular shape has been substituted for the combination of the coil 14 and plates or fins 24 of Figs. 3, 4 and 5; but the same principles before discussed have been applied in the design of the coil. It will be seen from a consideration of Fig. 6 that although the surface which the coil presents to the work to be heated is of substantially uniform spacing and area throughout the length or circumference of the coil, since it is determined by the uniform thickness of the conductor, its height (if it is regarded as being in a vertical plane in relation to the work) which is equal to the width of the conductor, is non-uniform throughout its length due to the transverse slots.

At the corners of the rectangle which it forms, the conductor is partially cut away from the edge remote from the work. Thus, the coil has little height and, therefore, the inducing current is concentrated near the work and the flux lines connecting it to the work are short, so that the density of both the inducing and induced currents at these points is comparatively large. At the sides of the rectangle, however, the height of the coil is substantial (in the embodiment illustrated, it is about 5.5 times the height of the corners), so that the flux lines are long and the current density is low. The work coil 26 is mounted on a support 28 of insulating material, and is connected by suitable conductors indicated at 30 to a source of alternating energy (not shown).

There has thus been described a method of and means for performing induction heating, in which the density of induced current at any part of a heating zone may be determined by a corresponding control of the inducing current at points in inductive relation with that part. This is effected by increasing or decreasing the effective cross-sectional area of the conductor through which the inducing current flows, in selected zones where greater or less heating is desired. By this means, any desired uniformity or non-uniformity of distribution of induced current density may be obtained. While the invention is of particular benefit in obtaining uniform heating of a rectangular zone or other zone with sharp corners, it may be employed to advantage in obtaining uniform heating of any non-circular zone. It may also be used where the non-uniformity is due to irregularity in the shape of the induction coil, or for any other reason. While the invention has been described primarily with reference to induction heating, it will be apparent that it may be used wherever a desired distribution of induced current is to be obtained, whether for heating or for any other purpose.

I claim as my invention:

1. An induction heating applicator for heating an object having sharp corners along a surface to be heated, comprising substantially a single turn conductor conforming in shape to said surface and including corresponding sharp corners tending in operation to provide a thinning of the flux at said corners of the work surface, and said conductor having regions of reduced cross section adjacent said sharp corners for concentrating the heating current and the heating flux at said corners, thereby to provide substantially uniform heating along the work surface both at and between said corners.

2. An induction heating coil for heating a work surface having angular relatively sharp bends between contiguous portions thereof, comprising substantially a single turn conductor conforming to the shape of and adapted to lie in spaced relation to and along said surface and having corresponding angular relatively sharp bends tending to distribute the heating flux along said surface in a path which excludes said conductor and the adjacent work surface at said bends, the width of the conductor being greater than its thickness and presenting its narrow surface to the work, and said conductor having regions of reduced width adjacent said bends to concentrate the heating current and the flux at said bends, whereby the heating is made substantially uniform along the work surface to be heated both at and between the bends.

THEODORE H. STORY.

REFERENCES CITED

The following references are of record in the file of this patent:

UNITED STATES PATENTS

| Number | Name | Date |
| --- | --- | --- |
| 1,932,423 | Sessions | Oct. 31, 1933 |
| 2,000,155 | White | May 7, 1935 |
| 2,144,377 | Kennedy | Jan. 17, 1939 |
| 2,303,408 | Soderholm | Dec. 1, 1942 |
| 2,314,865 | Bierwirth | Mar. 30, 1943 |
| 2,321,189 | Dravneek | June 8, 1943 |

FOREIGN PATENTS

| Number | Country | Date |
| --- | --- | --- |
| 484,316 | Great Britain | May 4, 1938 |

OTHER REFERENCES

Babat, "Construction of Heating Coils for Induction Surface Hardening," Heat Treating and Forging, March 1941, pages 137–139, particularly page 139.

Electronics, February 1944, page 116.

Electronic Industries, May 1944, page 111.